United States Patent
Lei et al.

(10) Patent No.: US 10,959,273 B2
(45) Date of Patent: Mar. 23, 2021

(54) PREAMBLE SEQUENCE CONFIGURATION FOR RANDOM ACCESS CHANNEL (RACH)

(71) Applicant: QUALCOMM Incorporated, San Diego, CA (US)

(72) Inventors: Jing Lei, San Diego, CA (US); Seyong Park, San Diego, CA (US); Linhai He, San Diego, CA (US); Jay Kumar Sundararajan, San Diego, CA (US); Hung Dinh Ly, San Diego, CA (US); Wanshi Chen, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/777,724

(22) Filed: Jan. 30, 2020

(65) Prior Publication Data

US 2020/0252975 A1 Aug. 6, 2020

Related U.S. Application Data

(60) Provisional application No. 62/800,636, filed on Feb. 4, 2019.

(51) Int. Cl.
*H04W 76/27* (2018.01)
*H04W 74/08* (2009.01)
*H04B 7/01* (2006.01)
*H04L 27/26* (2006.01)

(52) U.S. Cl.
CPC .......... *H04W 74/0833* (2013.01); *H04B 7/01* (2013.01); *H04L 27/2607* (2013.01); *H04W 76/27* (2018.02)

(58) Field of Classification Search
CPC .......................... H04W 76/27; H04W 74/0833
USPC ......................................................... 370/329
See application file for complete search history.

(56) References Cited

U.S. PATENT DOCUMENTS

2011/0261752 A1   10/2011   Fischer et al.

FOREIGN PATENT DOCUMENTS

| WO | 2012044240 A1 | 4/2012 |
| WO | 2019004694 A1 | 1/2019 |

OTHER PUBLICATIONS

International Search Report and Written Opinion—PCT/US2020/016092—ISA/EPO—dated May 4, 2020.

*Primary Examiner* — Angel T Brockman
(74) *Attorney, Agent, or Firm* — Harrity & Harrity, LLP

(57) ABSTRACT

Various aspects of the present disclosure generally relate to wireless communication. In some aspects, a user equipment (UE) may receive, from a base station (BS), a signaling communication that indicates one or more preamble sequence configurations. Each of the preamble sequence configurations may specify a respective plurality of preamble sequence rules for a different random access channel (RACH) procedure type. The UE may generate, based at least in part on a plurality of preamble sequence rules for a preamble sequence configuration of the one or more preamble sequence configurations, a preamble sequence for a RACH communication in a RACH procedure. Numerous other aspects are provided.

30 Claims, 11 Drawing Sheets

PREAMBLE SEQUENCE CONFIGURATION FOR RANDOM ACCESS CHANNEL (RACH)

CROSS-REFERENCE TO RELATED APPLICATION

This application claims priority to U.S. Provisional Application No. 62/800,636, filed on Feb. 4, 2019, entitled "PREAMBLE SEQUENCE CONFIGURATION FOR RANDOM ACCESS CHANNEL (RACH)," which is hereby expressly incorporated by reference herein.

FIELD OF THE DISCLOSURE

Aspects of the present disclosure generally relate to wireless communication and to techniques and apparatuses for preamble sequence configuration for random access channel (RACH).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving, from a base station (BS), a signaling communication that indicates one or more preamble sequence configurations, wherein each of the one or more preamble sequence configurations specifies a respective plurality of preamble sequence rules for a different random access channel (RACH) procedure type. The method may include generating, based at least in part on a plurality of preamble sequence rules for a preamble sequence configuration of the one or more preamble sequence configurations, a preamble sequence for a RACH communication in a RACH procedure.

In some aspects, a UE for wireless communication may include memory and one or more processors operatively coupled to the memory. The memory and the one or more processors may be configured to receive, from a BS, a signaling communication that indicates one or more preamble sequence configurations, wherein each of the one or more preamble sequence configurations specifies a respective plurality of preamble sequence rules for a different RACH procedure type. The memory and the one or more processors may be configured to generate, based at least in part on a plurality of preamble sequence rules for a preamble sequence configuration of the one or more preamble sequence configurations, a preamble sequence for a RACH communication in a RACH procedure.

In some aspects, a non-transitory computer-readable medium may store one or more instructions for wireless communication. The one or more instructions, when executed by one or more processors of a UE, may cause the one or more processors to receive, from a BS, a signaling communication that indicates one or more preamble sequence configurations, wherein each of the one or more preamble sequence configurations specifies a respective plurality of preamble sequence rules for a different RACH procedure type. The one or more instructions, when executed by one or more processors of a UE, may cause the one or more processors to generate, based at least in part on a plurality of preamble sequence rules for a preamble sequence configuration of the one or more preamble sequence configurations, a preamble sequence for a RACH communication in a RACH procedure.

In some aspects, an apparatus for wireless communication may include means for receiving, from a BS, a signaling communication that indicates one or more preamble sequence configurations, wherein each of the one or more preamble sequence configurations specifies a respective plurality of preamble sequence rules for a different RACH procedure type. The apparatus may include means for generating, based at least in part on a plurality of preamble sequence rules for a preamble sequence configuration of the one or more preamble sequence configurations, a preamble sequence for a RACH communication in a RACH procedure.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
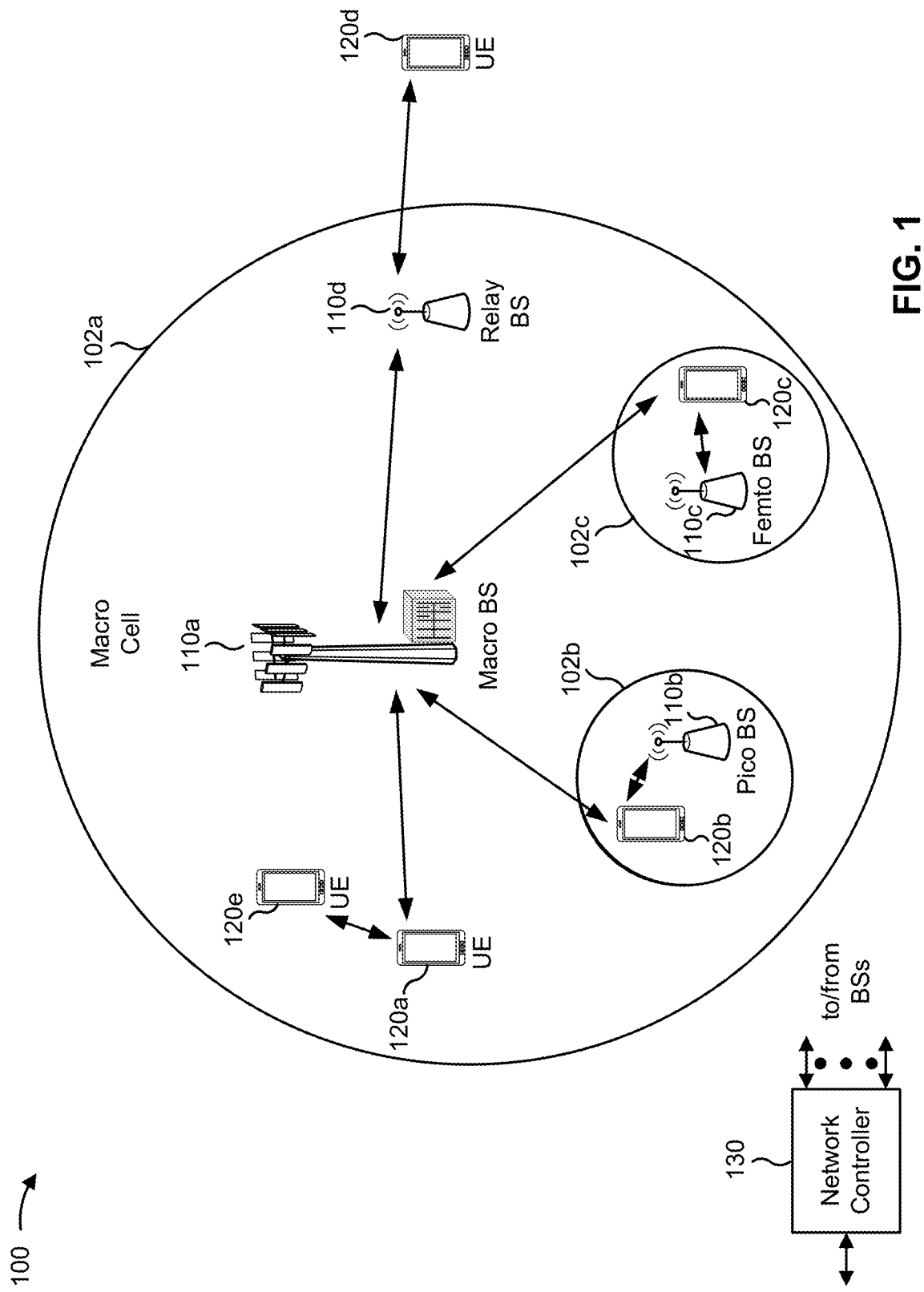
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
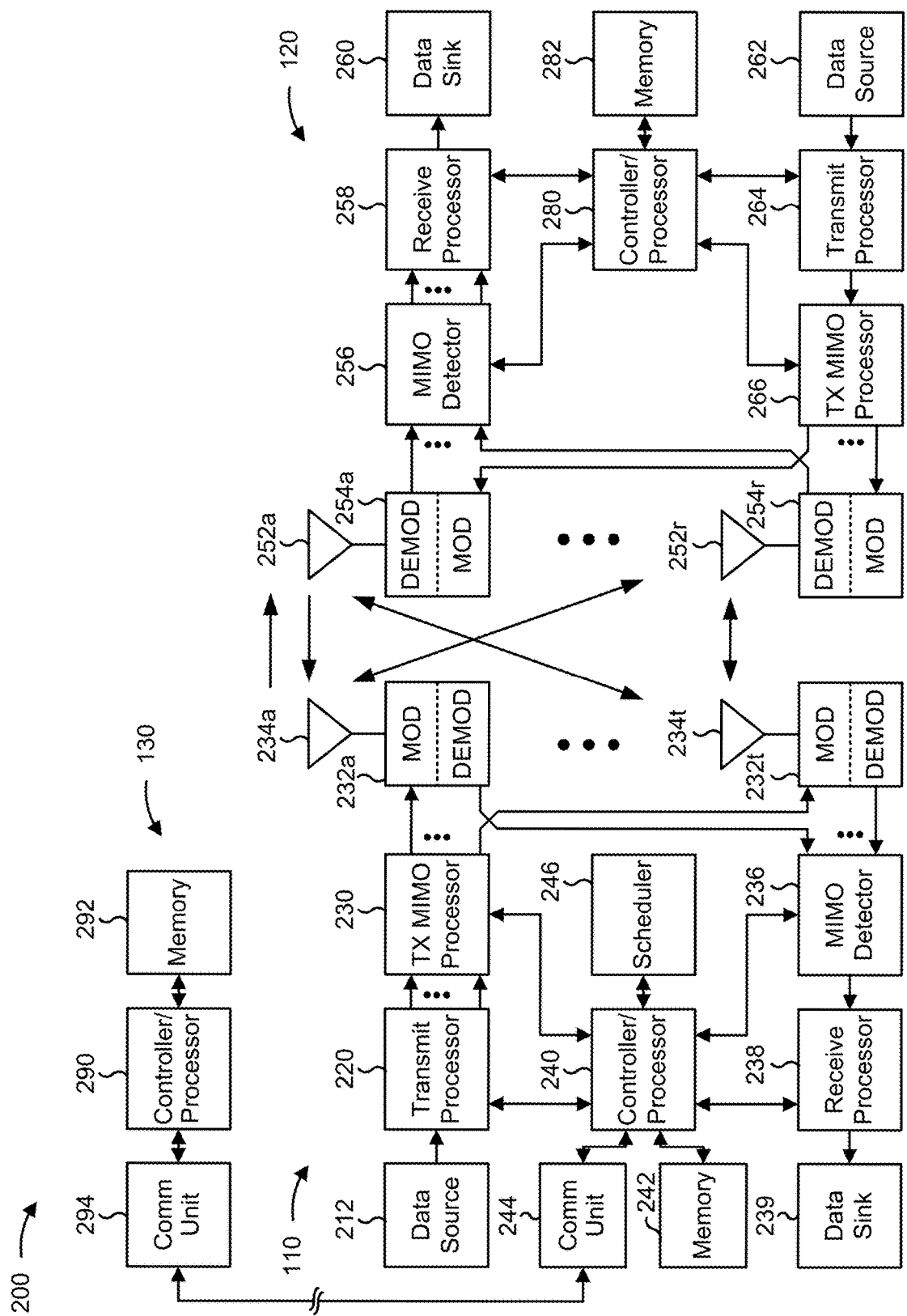
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with preamble sequence configuration for random access channel (RACH), as described in more detail elsewhere herein. For example, controller/processor 240 of base station 110, controller/processor 280 of UE 120, and/or any other component(s) of FIG. 2 may perform or direct operations of, for example, process 1000 of FIG. 10, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for receiving, from a BS 110, a signaling communication that indicates one or more preamble sequence configurations, wherein each of the one or more preamble sequence configurations specifies a respective plurality of preamble sequence rules for a different RACH procedure type, means for generating, based at least in part on a plurality of preamble sequence rules for a preamble sequence configuration of the one or more preamble sequence configurations, a preamble sequence for a RACH communication in a RACH procedure, and/or the like. In some aspects, such means may include one or more components of UE 120 described in connection with FIG. 2.

As indicated above, FIG. 2 is provided as an example. Other examples may differ from what is described with regard to FIG. 2.

Figure 3A:
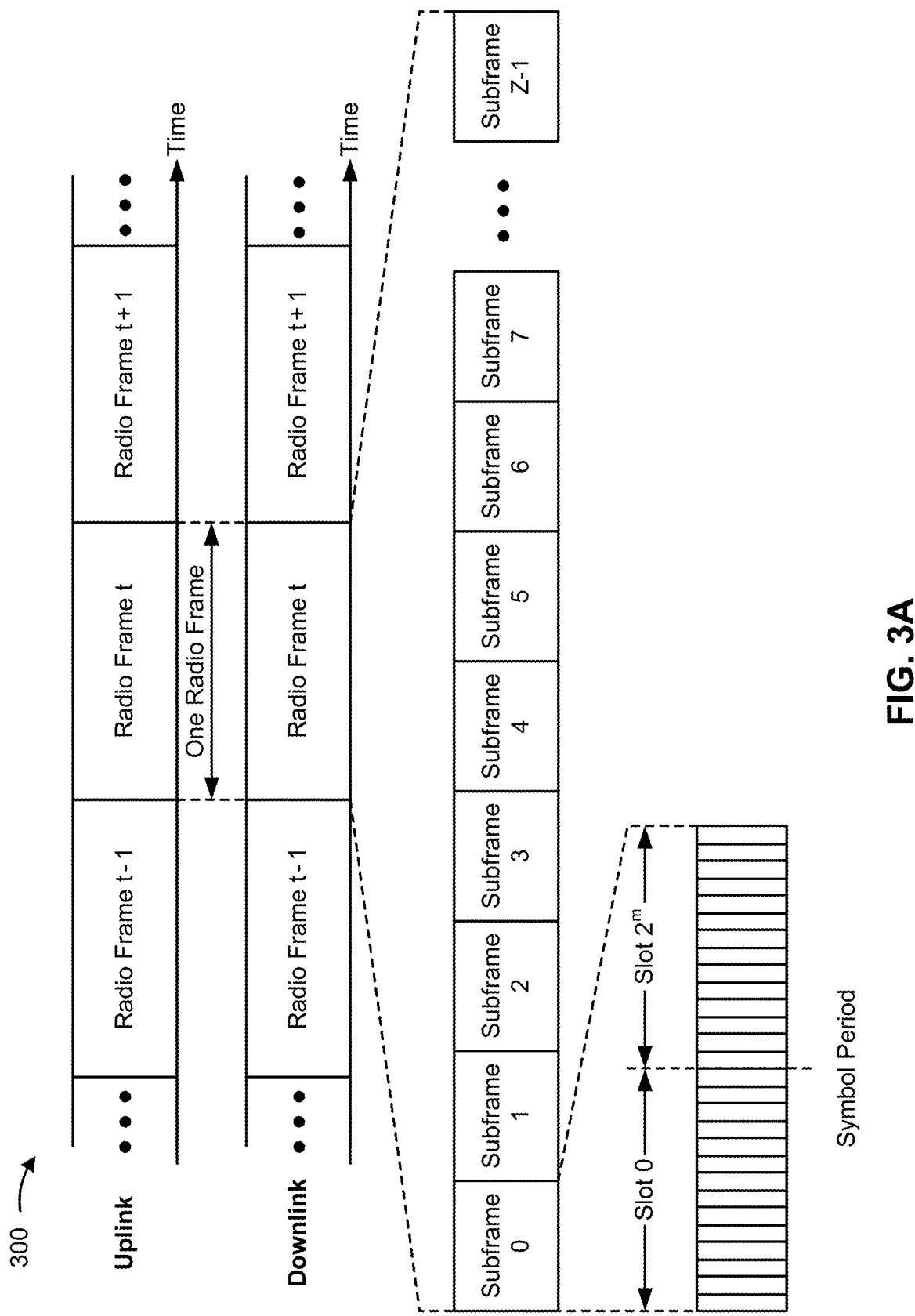
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may be frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
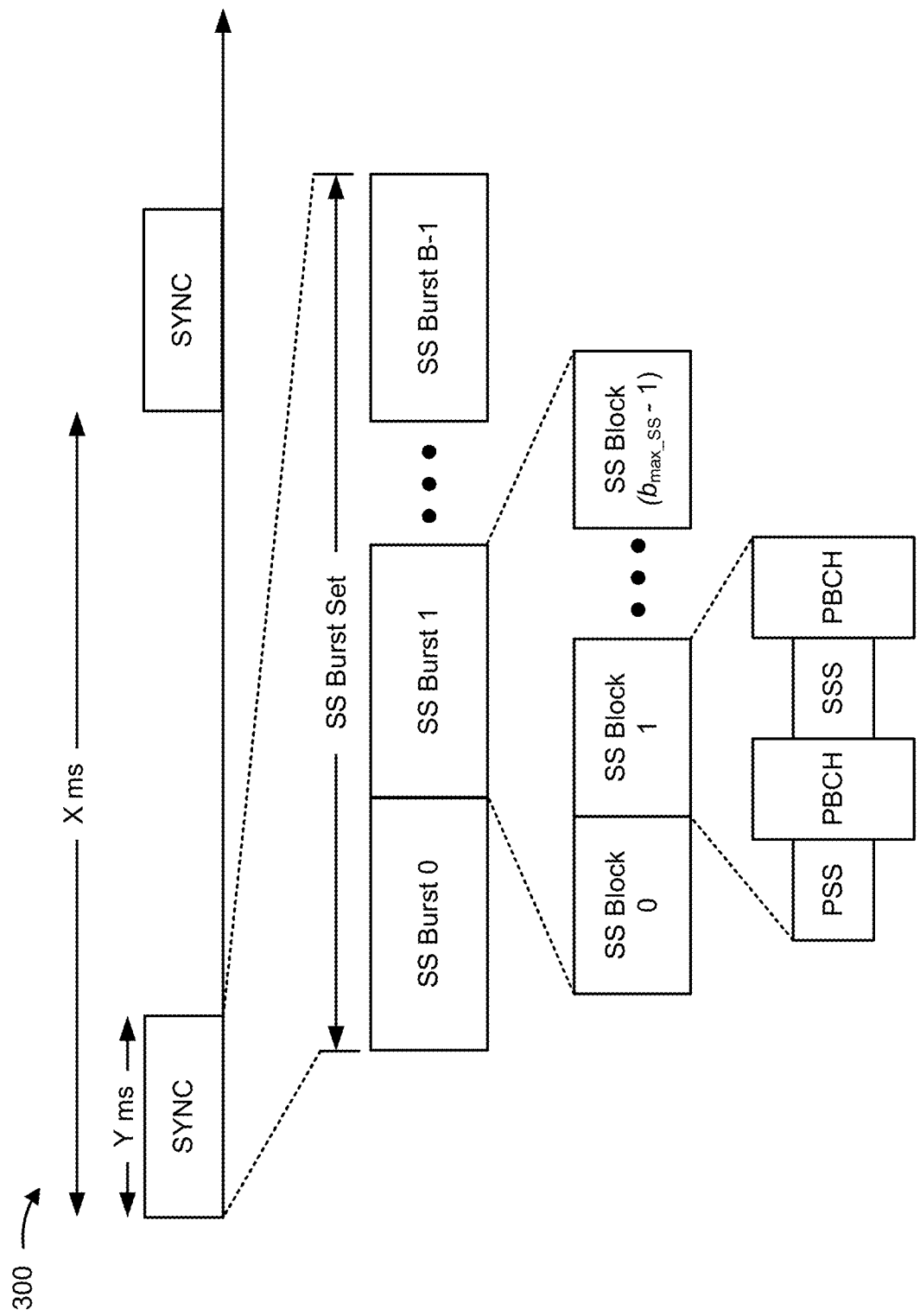
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS}$−1), where $b_{max\_SS}$−1 is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
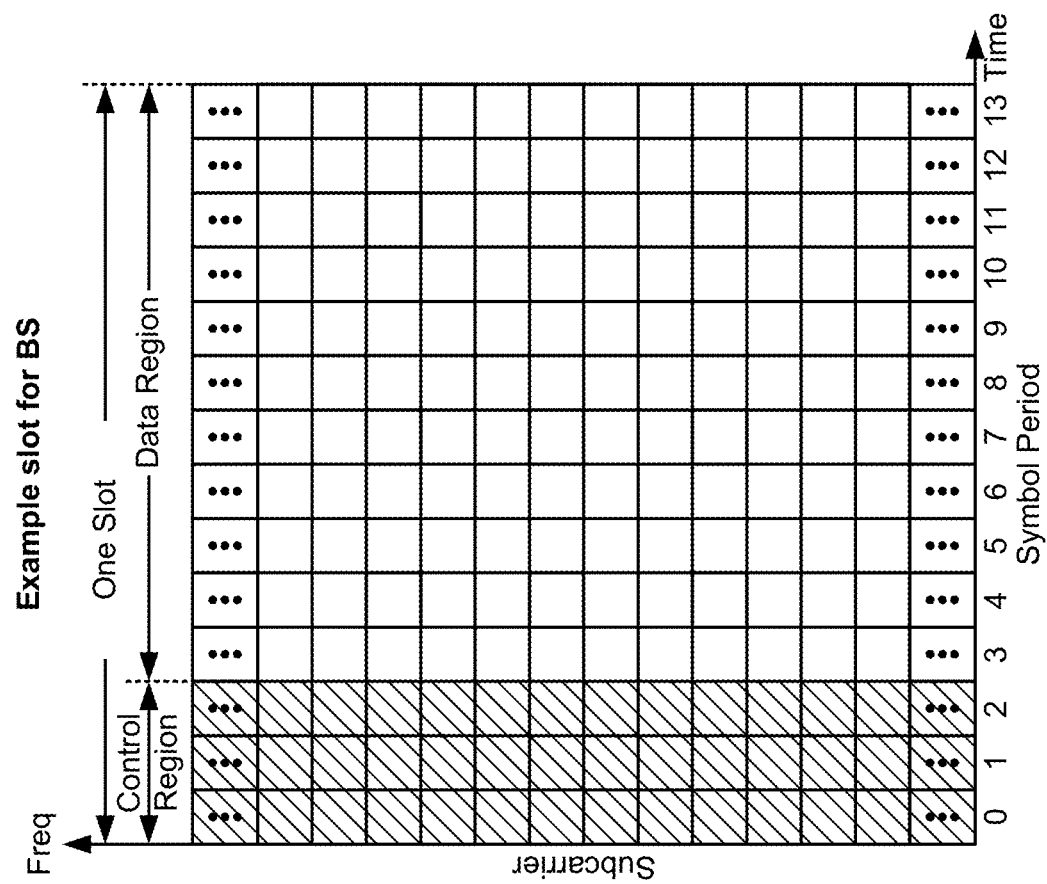
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where q E {0, . . . , Q−1}.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SNIR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such as central units or distributed units.

As indicated above, FIG. 4 is provided as an example. Other examples may differ from what is described with regard to FIG. 4.

Figure 5:
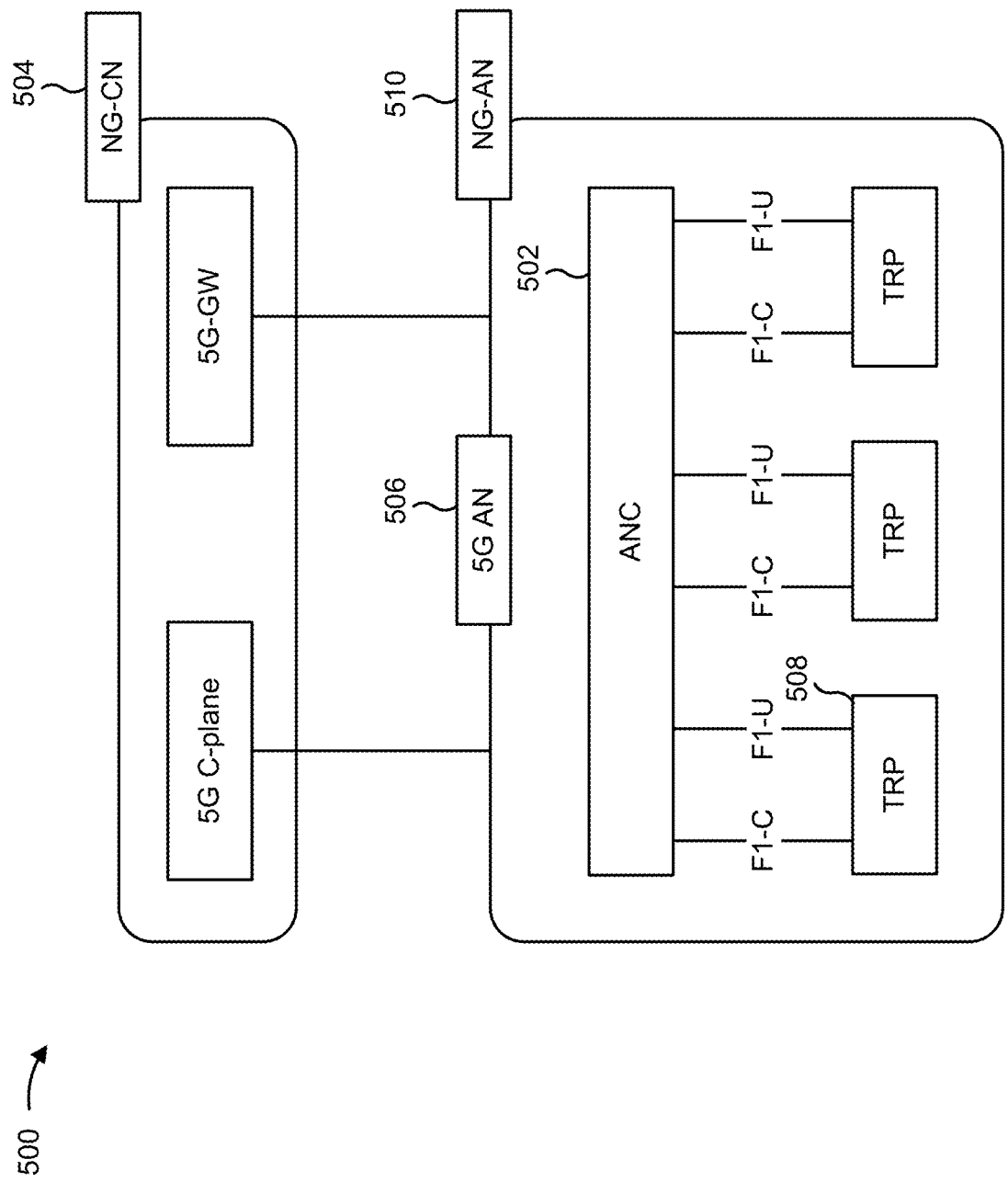
FIG. 5 illustrates an example logical architecture of a distributed radio access network (RAN), in accordance with various aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, "TRP" may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined to support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The packet data convergence protocol (PDCP), radio link control (RLC), media access control (MAC) protocol may be adaptably placed at the ANC or TRP.

According to various aspects, a BS may include a central unit (CU) (e.g., ANC 502) and/or one or more distributed units (e.g., one or more TRPs 508).

As indicated above, FIG. 5 is provided as an example. Other examples may differ from what is described with regard to FIG. 5.

Figure 6:
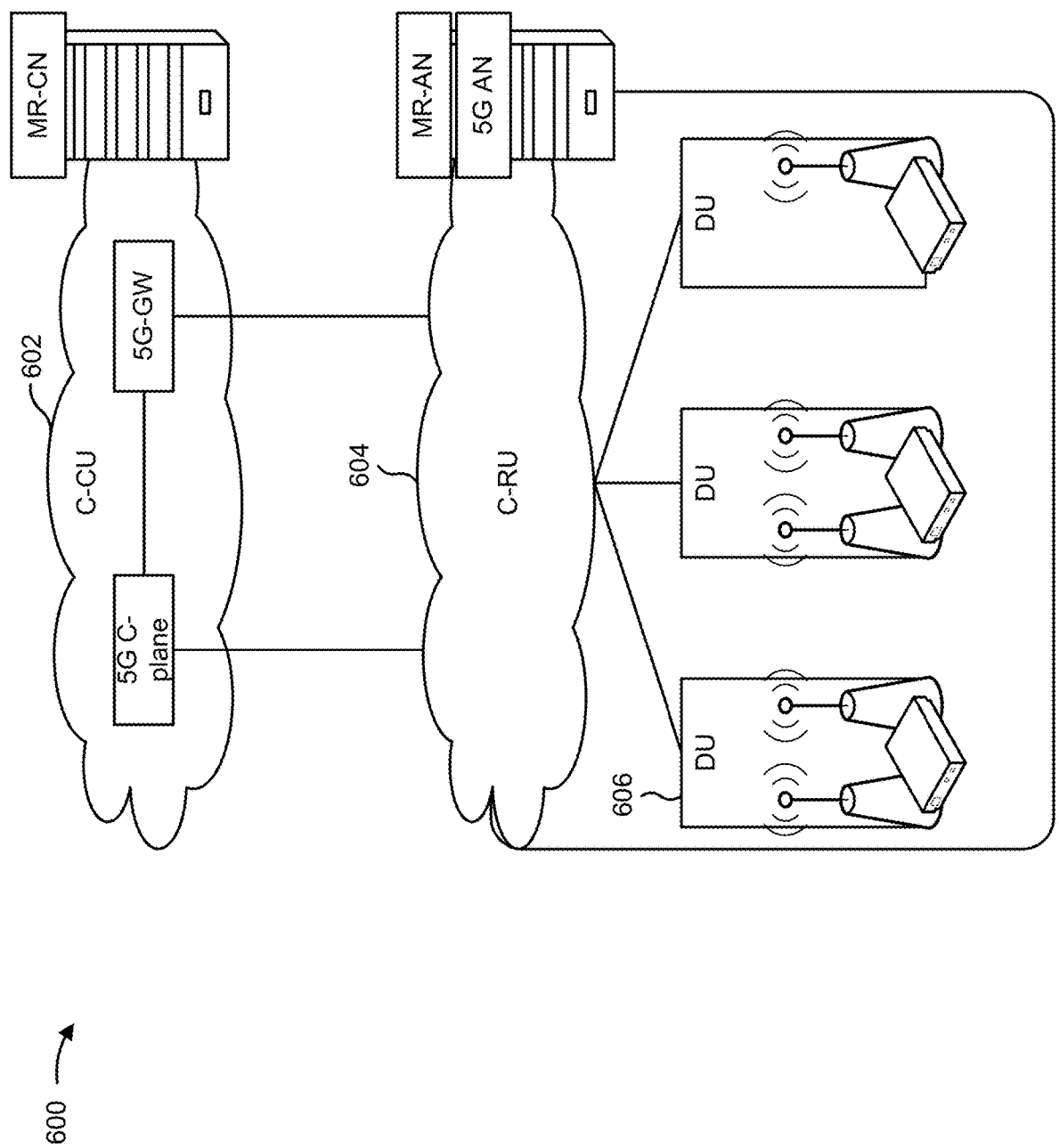
FIG. 6 illustrates an example physical architecture of a distributed RAN, in accordance with various aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided as an example. Other examples may differ from what is described with regard to FIG. 6.

Figure 7:
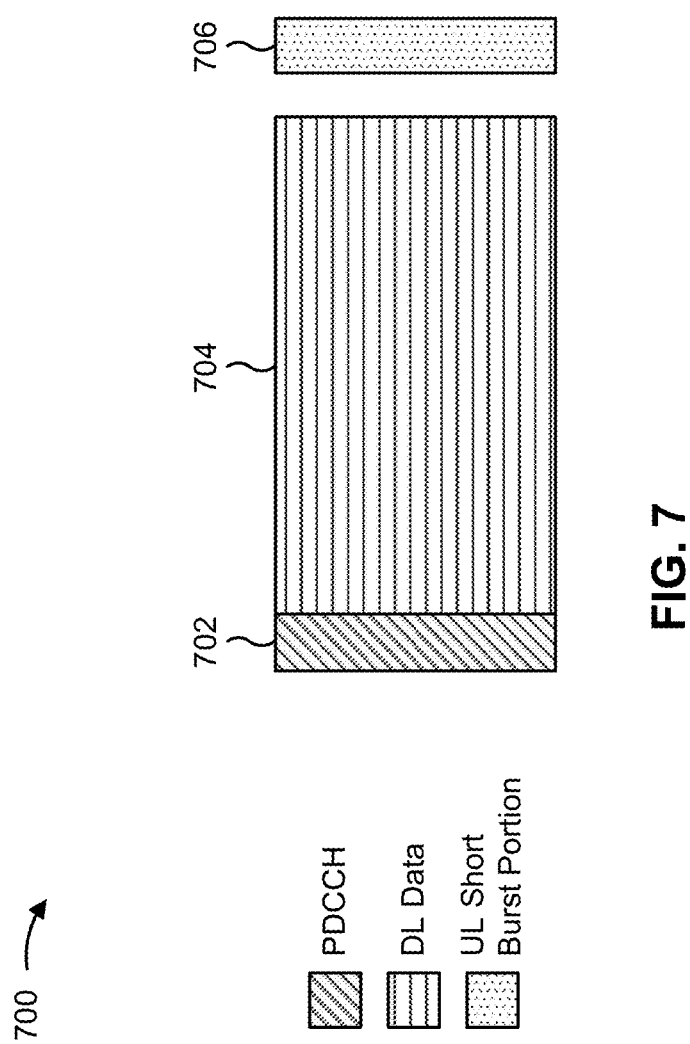
FIG. 7 is a diagram illustrating an example of a downlink (DL)-centric slot, in accordance with various aspects of the present disclosure.

FIG. 7 is a diagram 700 showing an example of a DL-centric slot or wireless communication structure. The DL-centric slot may include a control portion 702. The control portion 702 may exist in the initial or beginning portion of the DL-centric slot. The control portion 702 may include various scheduling information and/or control information corresponding to various portions of the DL-centric slot. In some configurations, the control portion 702 may be a physical DL control channel (PDCCH), as indicated in FIG. 7. In some aspects, the control portion 702 may include legacy PDCCH information, shortened PDCCH (sPDCCH) information), a control format indicator (CFI) value (e.g., carried on a physical control format indicator channel (PC-FICH)), one or more grants (e.g., downlink grants, uplink grants, and/or the like), and/or the like.

The DL-centric slot may also include a DL data portion 704. The DL data portion 704 may sometimes be referred to as the payload of the DL-centric slot. The DL data portion 704 may include the communication resources utilized to communicate DL data from the scheduling entity (e.g., UE or BS) to the subordinate entity (e.g., UE). In some configurations, the DL data portion 704 may be a physical DL shared channel (PD SCH).

The DL-centric slot may also include an UL short burst portion 706. The UL short burst portion 706 may sometimes be referred to as an UL burst, an UL burst portion, a common UL burst, a short burst, an UL short burst, a common UL short burst, a common UL short burst portion, and/or various other suitable terms. In some aspects, the UL short burst portion 706 may include one or more reference signals. Additionally, or alternatively, the UL short burst portion 706 may include feedback information corresponding to various other portions of the DL-centric slot. For example, the UL short burst portion 706 may include feedback information corresponding to the control portion 702 and/or the data portion 704. Non-limiting examples of information that may be included in the UL short burst portion 706 include an ACK signal (e.g., a PUCCH ACK, a PUSCH ACK, an immediate ACK), a NACK signal (e.g., a PUCCH NACK, a PUSCH NACK, an immediate NACK), a scheduling request (SR), a buffer status report (BSR), a HARQ indicator, a channel state indication (CSI), a channel quality indicator (CQI), a sounding reference signal (SRS), a demodulation reference signal (DMRS), PUSCH data, and/or various other suitable types of information. The UL short burst portion 706 may include additional or alternative information, such as information pertaining to random access channel (RACH) procedures, scheduling requests, and various other suitable types of information.

As illustrated in FIG. 7, the end of the DL data portion 704 may be separated in time from the beginning of the UL short burst portion 706. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is one example of a DL-centric wireless communication structure, and alternative structures having similar features may be implemented without necessarily deviating from the aspects described herein.

As indicated above, FIG. 7 is provided as an example. Other examples may differ from what is described with regard to FIG. 7.

Figure 8:
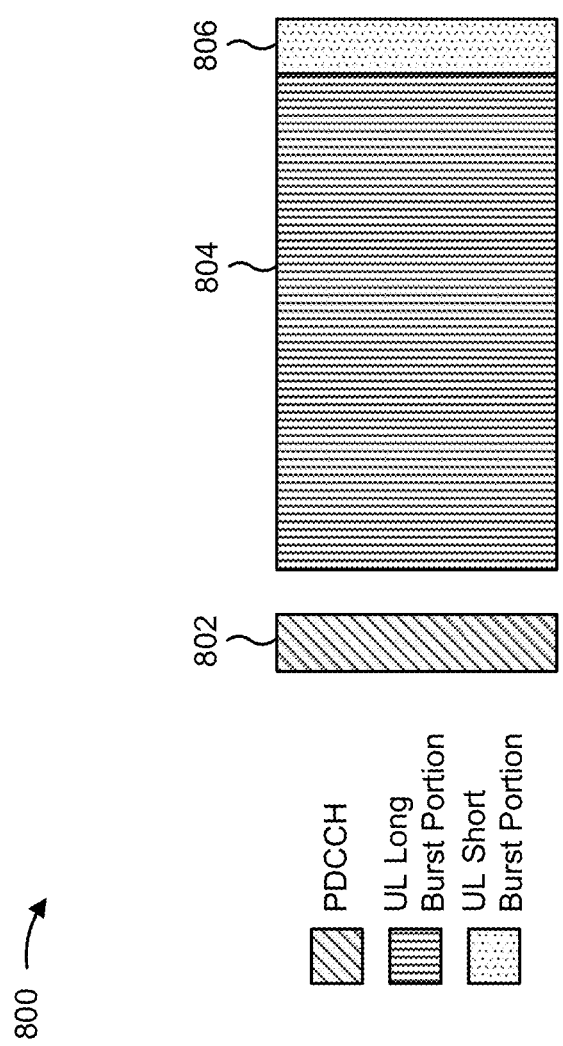
FIG. 8 is a diagram illustrating an example of an uplink (UL)-centric slot, in accordance with various aspects of the present disclosure.

FIG. 8 is a diagram 800 showing an example of an UL-centric slot or wireless communication structure. The UL-centric slot may include a control portion 802. The control portion 802 may exist in the initial or beginning portion of the UL-centric slot. The control portion 802 in FIG. 8 may be similar to the control portion 702 described above with reference to FIG. 7. The UL-centric slot may also include an UL long burst portion 804. The UL long burst portion 804 may sometimes be referred to as the payload of the UL-centric slot. The UL portion may refer to the communication resources utilized to communicate UL data from the subordinate entity (e.g., UE) to the scheduling entity (e.g., UE or BS). In some configurations, the control portion 802 may be a physical DL control channel (PDCCH).

As illustrated in FIG. 8, the end of the control portion 802 may be separated in time from the beginning of the UL long burst portion 804. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity).

The UL-centric slot may also include an UL short burst portion 806. The UL short burst portion 806 in FIG. 8 may be similar to the UL short burst portion 706 described above with reference to FIG. 7, and may include any of the information described above in connection with FIG. 7. The foregoing is one example of an UL-centric wireless communication structure, and alternative structures having similar features may be implemented without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some aspects, the sidelink signals may be communicated using a licensed spectrum (unlike wireless local area networks, which typically use an unlicensed spectrum).

In one example, a wireless communication structure, such as a frame, may include both UL-centric slots and DL-centric slots. In this example, the ratio of UL-centric slots to DL-centric slots in a frame may be dynamically adjusted based at least in part on the amount of UL data and the amount of DL data that are transmitted. For example, if there is more UL data, then the ratio of UL-centric slots to DL-centric slots may be increased. Conversely, if there is more DL data, then the ratio of UL-centric slots to DL-centric slots may be decreased.

As indicated above, FIG. 8 is provided as an example. Other examples may differ from what is described with regard to FIG. 8.

A UE may access a wireless network by negotiating a connection with a BS included in the wireless network. During connection establishment, the UE and the BS may synchronize the connection in the downlink direction (that is, from BS to UE) and in the uplink direction (that is, from UE to BS).

To synchronize the connection in the downlink direction, the UE may read a synchronization signal block (SSB) that includes various synchronization signals transmitted from the BS. The synchronization signals may include a PSS, an SSS, and/or the like. The UE may use the PSS to determine symbol timing in the downlink direction, and may use the SSS to determine a physical cell identifier, associated with the BS, and frame timing.

To synchronize the connection in the uplink direction, the UE and the BS may perform a RACH procedure. In some aspects, the UE and the BS may perform a four-step RACH procedure. In a four-step RACH procedure, the UE and the BS may exchange four primary RACH communications. The UE may transmit a msg1 communication to the BS. The msg1 communication may include a RACH preamble communication. The BS may respond to the msg1 communication with a msg2 communication, which may include a random access response (RAR) communication. The UE may respond to the msg2 communication with a msg3 communication, which may include a radio resource control (RRC) connection request communication. The BS may respond to the msg3 communication with a msg4 communication, which may include a medium-access-control control element (MAC-CE) contention resolution identifier, an RRCSetup command, and/or the like.

In some cases, the four-step RACH procedure may not meet the low latency requirements of 5G/NR wireless systems. Accordingly, the UE and the BS may use a two-step RACH procedure to reduce latency in synchronizing the connection in the uplink direction. In a two-step RACH procedure, the UE may combine the msg1 communication and the msg3 communication into a communication referred to as a msgA communication. The msg1 portion of the msgA communication may be referred to as the preamble portion of the msgA communication. The msg3 portion of the msgA communication may be referred to as the payload portion of the msgA. The UE may transmit the msg1 portion and the msg3 portion sequentially and prior to receiving the msg2 communication and the msg4 communication. The BS may receive the msgA communication and may transmit a msgB communication, which may include the msg2 communication and the msg4 communication.

In some cases, an uplink RACH communication (e.g., a msg1 communication in a four-step RACH procedure, a preamble portion of a msgA communication, and/or the like) may include a preamble sequence that is generated or selected by the UE. The UE and the BS may use the preamble sequence to uniquely identify the UE during the RACH procedure. For example, the BS may use the preamble sequence and a random access radio network temporary identifier (RA-RNTI) to address a downlink RACH communication to the UE (e.g., a msg2 communication in a four-step RACH procedure, a msgB communication in a two-step RACH procedure, and/or the like).

In some cases, the UE may generate a preamble sequence by cyclically shifting a root sequence (e.g., a Zadoff-Chu root sequence or another type of root sequence) based at least in part on a cyclic shift. Various cyclic shifts may be applied to the same root sequence to generate a plurality of preamble sequences in the same zero-correlation zone (i.e., the resulting preamble sequences are orthogonal and have zero or close to zero correlation).

The BS may communicate a root sequence, to the UE, in a signaling communication such as a system information block (SIB) (e.g., SIB2). To ensure that the cyclic shifts that the UE applies to the root sequence are spaced far enough apart to maintain orthogonality and zero correlation, the BS may also specify a cyclic shift step size (i.e., a parameter that specifies spacing between cyclic shifts) in the signaling communication. The cyclic shift step size may account for propagation delay and/or multi-path delay between the UE and the BS.

In some cases, carrier frequency offset between the BS and the UE may cause a residual cyclic shift to accumulate at the UE. Carrier frequency offset may occur where a UE drifts out of synchronization from the BS, which may occur, for example, due to Doppler shift and/or the UE being in an RRC inactive or an RRC idle state. Some root sequences may be more susceptible to carrier frequency offset than other root sequences. If the UE uses a root sequence that is susceptible to carrier frequency offset to generate a preamble sequence, the residual cyclic shift can cause the UE to generate a preamble sequence that collides with another preamble sequence that is being used by another UE, which may be referred to as a contention. The contention may cause delays in the RACH process and/or may cause the UE and the BS to have to perform additional processes to resolve the contention, which results in additional radio and processing resources being consumed.

Some aspects, described herein, provide techniques and apparatuses for preamble sequence configuration for RACH. In some aspects, a BS may transmit a signaling communication that indicates a preamble sequence configuration for a RACH procedure. The preamble sequence configuration may specify a plurality of preamble sequence rules, such as a preamble sequence rule for selecting a root sequence and a cyclic shift, a preamble sequence rule for selecting a cyclic shift step size, a preamble sequence rule for generating a composite preamble sequence, and/or the like.

In this way, the UE may receive the signaling communication and may use the preamble sequence rules to select root sequences, cyclic shifts, and/or cyclic shift step sizes for generating a preamble sequence based at least in part on various properties associated with the UE, such as an RRC state of the UE, Doppler shift associated with the UE, a pathloss associated with the UE, a distance of the UE from the center of a cell associated with the BS, and/or other properties. This reduces the likelihood that the UE generates a preamble sequence that collides with another preamble sequence that is being used by another UE, which in turn reduces preamble sequence collisions at the BS. The reduced quantity of collisions reduces delays in RACH processes due to contentions and reduces the consumption of radio and processing resources for resolving the contentions.

Figure 9:
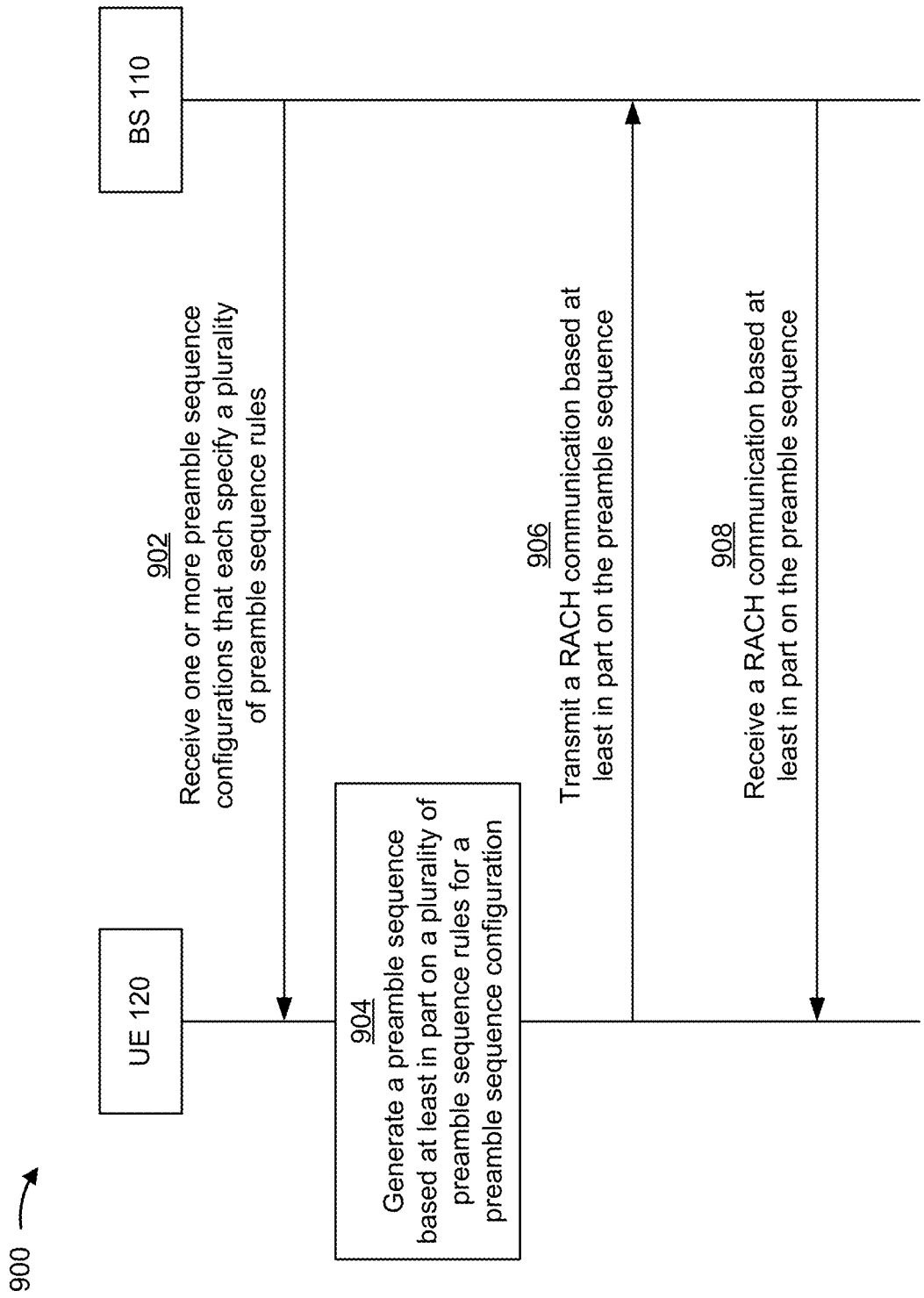
FIG. 9 is a diagram illustrating an example of preamble sequence configuration for random access channel (RACH), in accordance with various aspects of the present disclosure.

FIG. 9 is a diagram illustrating an example 900 of preamble sequence configuration for RACH, in accordance with various aspects of the present disclosure. As shown in FIG. 9, example 900 may include communications between a user equipment (e.g., UE 120) and a base station (e.g., BS 110). In some aspects, BS 110 and UE 120 may be included in a wireless network (e.g., wireless network 100).

In some aspects, BS 110 and UE 120 may establish a connection using a RACH procedure, such as a four-step RACH procedure, a two-step RACH procedure, and/or the like. For example, UE 120 may initiate the RACH procedure by transmitting, to BS 110, a RACH communication. The RACH communication may include a msg1 communication in a four-step RACH procedure, a msgA communication in a two-step RACH procedure, and/or the like. In some aspects, UE 120 may generate a preamble sequence for the RACH communication. The preamble sequence may be used to uniquely identify UE 120 during the RACH procedure.

As shown in FIG. 9, and by reference number 902, UE 120 may receive, from BS 110, one or more preamble sequence configurations. Each of the one or more preamble sequence configurations may specify a respective plurality of preamble sequence rules. BS 110 may transmit the one or more preamble sequence configurations to UE 120 in a signaling communication such as a SIM communication, a radio resource control (RRC) communication, a downlink control information (DCI) communication, and/or the like.

In some aspects, each of the one or more preamble sequence configurations may specify a respective plurality of preamble sequence rules for a RACH procedure type. In some aspects, each of the one or more preamble sequence configurations may specify a respective plurality of preamble sequence rules for a different RACH procedure type. For example, a first preamble sequence configuration may specify a plurality of preamble sequence rules for two-step RACH procedures, a second preamble sequence configuration may specify a plurality of preamble sequence rules for four-step RACH procedures, and so on. In this case, each preamble sequence configuration may include a different set or subset of preamble sequence rules relative to other preamble sequence configurations.

The plurality of preamble sequence rules may specify various preamble sequence rules for generating a preamble sequence. For example, the plurality of preamble sequence rules may specify a preamble format rule, which may specify a quantity of preamble sequences and a quantity of repetitions for a preamble sequence to be generated by UE 120. In this case, UE 120 may generate a preamble sequence based at least in part on the quantity of preamble sequences and/or the quantity of repetitions specified by the preamble format rule.

As another example, the plurality of preamble sequence rules may include a preamble sequence rule for selecting a root sequence, a preamble sequence rule for selecting a cyclic shift, a preamble sequence rule for selecting a cyclic shift step size, a preamble sequence rule for generating a composite preamble sequence, and/or the like.

The preamble sequence rule for selecting the root sequence may specify a plurality of candidate root sequences that UE 120 may choose from, and one or more parameters for selecting the root sequence from the plurality of candidate root sequences. The one or more parameters may include an RRC state of UE 120, a payload size of data to be transmitted in the RACH communication (e.g., a msgA payload size), an amount of Doppler shift associated with UE 120, and/or the like.

In some aspects, at least some of the plurality of candidate root sequences may correspond to different time domain resources and/or frequency domain resources than other candidate root sequences in the plurality of candidate root sequences. In some aspects, at least some of the plurality of candidate root sequences may correspond to the same time domain resources and/or frequency domain resources as other candidate root sequences in the plurality of candidate root sequences.

The preamble sequence rule for selecting the cyclic shift may specify a plurality of candidate cyclic shifts that UE 120 may choose from, and one or more parameters for selecting the cyclic shift from the plurality of candidate cyclic shifts.

The one or more parameters may include an RRC state of UE 120, a payload size of data to be transmitted in the RACH communication (e.g., a msgA payload size), an amount of Doppler shift associated with UE 120, and/or the like.

In some aspects, at least some of the plurality of candidate cyclic shifts may correspond to different time domain resources and/or frequency domain resources than other candidate cyclic shifts in the plurality of candidate cyclic shifts. In some aspects, at least some of the plurality of candidate cyclic shifts may correspond to the same time domain resources and/or frequency domain resources as other candidate cyclic shifts in the plurality of candidate cyclic shifts.

The preamble sequence rule for selecting the cyclic shift step size may specify a plurality of candidate cyclic shift step sizes (and thus a plurality of zero-correlation zones) that UE 120 may choose from, and one or more parameters for selecting the cyclic shift step size from the plurality of candidate cyclic shift step sizes in order to maintain zero correlation between the preamble sequence and other preamble sequences. The one or more parameters may include an RRC state of UE 120, an amount of pathloss between UE 120 and BS 110, a distance of UE 120 from a center of a cell associated with BS 110, a round trip time between UE 120 and BS 110, a multi-path delay spread associated with UE 120, and/or the like.

The preamble sequence rule for generating a composite preamble sequence may specify whether or not UE 120 is to generate a preamble sequence that is a composite of a plurality of initial preamble sequences, may specify one or more parameters for generating the composite preamble sequence, and/or the like. The one or more parameters may include a quantity of initial preamble sequences that are to be used to generate the composite preamble sequence, whether the initial preamble sequences are to be generated using the same root sequence or different root sequences, whether the initial preamble sequences are to be generated using the same cyclic shift or different cyclic shifts, whether the initial preamble sequences are to be generated using the same cyclic shift step size (and thus the same zero-correlation zone) or different cyclic shift step sizes (and thus different zero-correlation zones), whether UE 120 is to apply a code cover to the composite preamble sequence, a type of code cover that is to be used (e.g., an orthogonal code cover, a quasi-orthogonal code cover, and/or the like), and/or the like.

In some aspects, a code cover may include a binary random code "cover" with asymmetrical run length (for 1's and −1's), and run lengths equal to or greater than two may be used to preserve phase continuity and provide an expanded time window for over-sized Fast Fourier Transform (FFT), which may improve frequency offset resolution. In some aspects, code cover polarity reverse asymmetry may help resolving timing ambiguity. In some aspects, the code cover may include a Barker code, a Walsh code, or the like.

As further shown in FIG. 9, and by reference number 904, UE 120 may generate a preamble sequence based at least in part on the plurality of preamble sequence rules specified in the preamble sequence configuration. For example, UE 120 may select a root sequence, a cyclic shift, and/or a cyclic shift step size, based at least in part on the plurality of preamble sequence rules, and may use the root sequence, the cyclic shift, and/or the cyclic shift step size to generate the preamble sequence.

In some aspects, UE 120 may identify or select a preamble sequence configuration (and thus, the plurality of preamble sequence rules) from the one or more preamble sequence configurations based at least in part on performing a signal measurement of a measurement resource (e.g., a reference signal or a specified data transmission transmitted by BS 110). For example, the UE 120 may perform a signal measurement (e.g., a reference signal received power (RSRP) measurement, a reference signal received quality (RSRQ) measurement, a received signal strength indicator (RSSI) measurement and/or the like) of the measurement resource, may perform a propagation delay measurement between UE 120 and BS 110, may perform a round-trip time measurement between UE 120 and BS 110, may perform a Doppler shift measurement associated with UE 120, and/or the like, and may identify or select the preamble sequence configuration based at least in part on determining whether the signal measurement (or other types of measurements) satisfies a corresponding threshold. In some aspects, the one or more reference signals may include a system information block (e.g., SIB1, SIB2, and/or the like), a positioning reference signal (PRS), a channel state information reference signal (CSI-RS), and/or another type of reference signal.

As an example, UE 120 may identify or select a preamble sequence configuration (and thus, the root sequence, the cyclic shift, the cyclic shift step size, and/or other preamble sequence rules) for a two-step RACH procedure based at least in part on determining that the signal measurement satisfies the threshold. As another example, UE 120 may identify or select a preamble sequence configuration (and thus, the root sequence, the cyclic shift, the cyclic shift step size, and/or other preamble sequence rules) for a four-step RACH procedure based at least in part on determining that the signal measurement does not satisfy the threshold.

In some aspects, UE 120 may select the root sequence, from the plurality of candidate root sequences, based at least in part on the one or more parameters for selecting the root sequence. For example, UE 120 may determine that UE 120 is in an RRC idle or RRC inactive state, may determine that UE 120 is experiencing high Doppler shift (e.g., due to high mobility of UE 120), and/or the like, and may accordingly select a root sequence, of the plurality of candidate root sequences, that is less susceptible to carrier frequency offset (or residual cyclic shift).

Similarly, UE 120 may select the cyclic shift, from the plurality of candidate cyclic shifts, based at least in part on the one or more parameters for selecting the cyclic shift. For example, UE 120 may determine that UE 120 is in an RRC idle or RRC inactive state, may determine that UE 120 is experiencing high Doppler shift (e.g., due to high mobility of UE 120), and/or the like, and may accordingly select a cyclic shift, of the plurality of candidate cyclic shifts, that is less susceptible to carrier frequency offset (or residual cyclic shift).

In some aspects, UE 120 may select a cyclic shift step size from the plurality of candidate cyclic shift step sizes, based at least in part on the one or more parameters for selecting the cyclic shift step size. For example, UE 120 may select a larger cyclic shift step size the further away UE 120 is from the center of the cell of BS 110, the higher the amount of pathloss UE 120 is experiencing, the greater the round-trip time between UE 120 and BS 110, the greater the amount of propagation delay between UE 120 and BS 110, and/or based at least in part on determining that UE 120 is in an RRC idle or inactive state. In this way, UE 120 uses a larger cyclic shift step size (which correlates to a sparser zero-correlation zone) to accommodate a larger range of timing and/or frequency offset due to the distance between UE 120 and BS 110 and/or the RRC state of UE 120.

Conversely, UE 120 may select a smaller cyclic shift step size the closer UE 120 is to the center of the cell of BS 110, the lower the amount of pathloss UE 120 is experiencing, the shorter the round-trip time between UE 120 and BS 110, the lower the amount of propagation delay between UE 120 and BS 110, and/or based at least in part on determining that UE 120 is in an RRC active state, and/or the like. In this way, since the timing and/or frequency offset range may be smaller due to UE 120 being closer to BS 110 and/or being in an RRC active state, UE 120 may use a smaller cyclic shift step size, which correlates to a denser zero-correlation zone, which in turn permits a greater quantity of unique preamble sequences to be generated from the same root sequence.

In some aspects, UE 120 may generate a composite preamble sequence based at least in part on the preamble sequence rule for generating a composite preamble sequence specifying that UE 120 is to generate a composite preamble sequence. UE 120 may generate a plurality of initial preamble sequences according to the quantity of initial preamble sequences specified in the one or more parameters for generating the composite preamble sequence. In some aspects, UE 120 may generate, based at least in part on the one or more parameters for generating the composite preamble sequence, the plurality of preamble sequences such that the plurality of preamble sequences are generated using the same root sequence or different root sequences, such that the plurality of preamble sequences are generated using the same cyclic shift or different cyclic shifts, such that the plurality of preamble sequences are generated using the same cyclic shift step size or different cyclic shift step sizes, and/or the like.

In some aspects UE 120 may generate the composite preamble sequence by concatenating the plurality of initial preamble sequences or combining the plurality of initial preamble sequences in another manner. In some aspects, UE 120 may apply a code cover to the composite preamble sequence based at least in part on the one or more parameters for generating the composite preamble sequence specifying that UE 120 is to apply a code cover to the composite preamble sequence. UE 120 may determine that the length of the code cover to be applied to the composite preamble sequence based at least in part on the quantity of initial preamble sequences that are used to generate the composite preamble sequence (e.g., the length of the code cover may be equal to the quantity of initial preamble sequences, may be equal to the quantity of repetitions of the initial preamble sequences included in the composite preamble sequence, and/or the like).

As further shown in FIG. 9, and by reference number 906, UE 120 may transmit the RACH communication based at least in part on the preamble sequence. For example, UE 120 may transmit the preamble sequence as part of a msg1 communication in a four-step RACH procedure, may transmit the preamble sequence as part of a preamble portion of a msgA communication, and/or the like. UE 120 may further indicate, in the RACH communication, an RA-RNTI associated with the time domain and frequency domain resources in which the RACH communication is transmitted.

As further shown in FIG. 9, and by reference number 908, BS 110 may receive the RACH communication and transmit a RACH communication to UE 120 based at least in part on the preamble sequence. For example, BS 110 may transmit a msg2 communication in a four-step RACH procedure, may transmit a msgB communication in a two-step RACH procedure, and/or the like.

To transmit the RACH communication to UE 120, BS 110 may scramble the RACH communication using the RA-RNTI indicated in the RACH communication received from UE 120. In this way, only UEs that transmitted the RACH communication using the RA-RNTI may descramble and read the other RACH communication. BS 110 may configure a MAC protocol data unit (PDU) to carry the RACH communication and other RACH communications directed to one or more other UEs. The RACH communication may be included in one or more MAC sub-PDUs in the MAC PDU. UE 120 may receive the MAC PDU, may descramble the MAC PDU using the RA-RNTI, and may identify the one or more MAC sub-PDUs, carrying the RACH communication directed to UE 120, based at least in part on identifying a random access preamble identifier (RAPID) associated with the preamble sequence that was generated by UE 120.

In this way, BS 110 may transmit a signaling communication that indicates a preamble sequence configuration for a RACH procedure. The preamble sequence configuration may specify a plurality of preamble sequence rules, such as a preamble sequence rule for selecting a root sequence and a cyclic shift, a preamble sequence rule for selecting a cyclic shift step size, a preamble sequence rule for generating a composite preamble sequence, and/or the like. UE 120 may receive the signaling communication and may use the preamble sequence rules to select root sequences, cyclic shifts, and/or cyclic shift step sizes for generating a preamble sequence based at least in part on various properties associated with UE 120, such as an RRC state of UE 120, Doppler shift associated with UE 120, a pathloss associated with UE 120, a distance of UE 120 from the center of a cell associated with BS 110, and/or other properties. This reduces the likelihood that UE 120 generates a preamble sequence that collides with another preamble sequence that is being used by another UE, which in turn reduces preamble sequence collisions at BS 110. The reduced quantity of collisions reduces delays in RACH processes due to contentions and reduces the consumption of radio and processing resources for resolving the contentions.

As indicated above, FIG. 9 is provided as an example. Other examples may differ from what is described with respect to FIG. 9.

Figure 10:
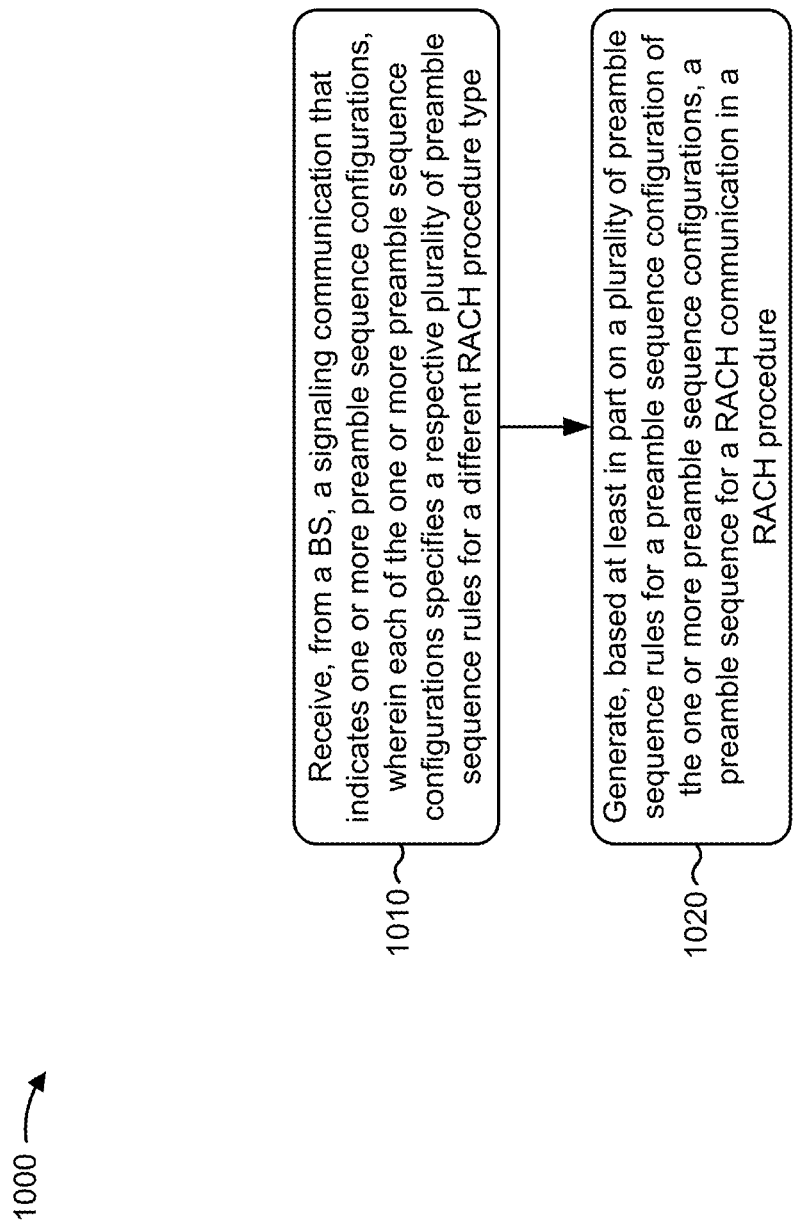
FIG. 10 is a diagram illustrating an example process performed, for example, by a user equipment (UE), in accordance with various aspects of the present disclosure.

FIG. 10 is a diagram illustrating an example process 1000 performed, for example, by a UE, in accordance with various aspects of the present disclosure. Example process 1000 is an example where a UE (e.g., UE 120 and/or the like) performs operations associated with preamble sequence configuration for RACH.

As shown in FIG. 10, in some aspects, process 1000 may include receiving, from a BS, a signaling communication that indicates one or more preamble sequence configurations, wherein each of the one or more preamble sequence configurations specifies a respective plurality of preamble sequence rules for different RACH procedure types (block 1010). For example, the UE (e.g., using receive processor 258, transmit processor 264, controller/processor 280, memory 282, and/or the like) may receive, from a BS, a signaling communication that indicates one or more preamble sequence configurations, as described above. In some aspects, each of the one or more preamble sequence configurations specifies a respective plurality of preamble sequence rules for a different RACH procedure type.

As further shown in FIG. 10, in some aspects, process 1000 may include generating, based at least in part on a plurality of preamble sequence rules for a preamble sequence configuration of the one or more preamble sequence configurations, a preamble sequence for a RACH communication in a RACH procedure (block 1020). For example, the UE (e.g., using receive processor 258, transmit processor 264, controller/processor 280, memory 282, and/or the like) may generate, based at least in part on a plurality of preamble sequence rules for a preamble sequence configuration of the one or more preamble sequence configurations, a preamble sequence for a RACH communication in a RACH procedure, as described above.

Process 1000 may include additional aspects, such as any single implementation or any combination of aspects described below and/or in connection with one or more other processes described elsewhere herein.

In a first aspect, the plurality of preamble sequence rules comprises at least one of a preamble sequence rule that specifies a plurality of candidate root sequences for generating the preamble sequence, a cyclic shift rule that specifies a plurality of candidate cyclic shifts for generating the preamble sequence, or a preamble format rule that specifies a quantity of preamble sequences and a quantity of repetitions for the preamble sequence, and generating the preamble sequence comprises at least one of selecting a root sequence from the plurality of candidate root sequences, selecting a cyclic shift from the plurality of candidate cyclic shifts, generating the preamble sequence based at least in part on the root sequence and the cyclic shift, or generating the preamble sequence based at least in part on the quantity of preamble sequences and the quantity of repetitions for the preamble sequence.

In a second aspect, alone or in combination with the first aspect, selecting the root sequence and the cyclic shift comprises selecting the root sequence and the cyclic shift based at least in part on at least one of an RRC state of the UE, a payload size of data to be transmitted in the RACH communication, or an amount of Doppler shift associated with the UE. In a third aspect, alone or in combination with one or more of the first and second aspects, a first candidate root sequence and a first candidate cyclic shift, of the plurality of candidate root sequences and the plurality of candidate cyclic shifts, corresponds to a same time resource and a same frequency resource as a second candidate root sequence and a second candidate cyclic shift of the plurality of candidate root sequences and the plurality of candidate cyclic shifts.

In a fourth aspect, alone or in combination with one or more of the first through third aspects, a first candidate root sequence of the plurality of candidate root sequences and a first candidate cyclic shift of the plurality of candidate cyclic shifts, and a second candidate root sequence of the plurality of candidate root sequences and a second candidate cyclic shift of the plurality of candidate cyclic shifts, correspond to different time resources and different frequency resources. In a fifth aspect, alone or in combination with one or more of the first through fourth aspects, the RACH communication comprises a msgA communication in a two-step RACH procedure or a msg1 communication in a four-step RACH procedure.

In a sixth aspect, alone or in combination with one or more of the first through fifth aspects, generating the preamble sequence comprises generating a plurality of initial preamble sequences, and generating a composite preamble sequence based at least in part on the plurality of initial preamble sequences. In a seventh aspect, alone or in combination with one or more of the first through sixth aspects, generating the composite preamble sequence comprises concatenating the plurality of initial preamble sequences to form the composite preamble sequence. In an eighth aspect, alone or in combination with one or more of the first through seventh aspects, generating the plurality of initial preamble sequences comprises generating a first initial preamble sequence based at least in part on a first root sequence and a first cyclic shift step size, and generating a second initial preamble sequence based at least in part on the first root sequence and a second cyclic shift step size.

In a ninth aspect, alone or in combination with one or more of the first through eighth aspects, generating the plurality of initial preamble sequences comprises generating a first initial preamble sequence based at least in part on a first root sequence and a first cyclic shift step size, and generating a second initial preamble sequence based at least in part on a second root sequence and the first cyclic shift step size. In a tenth aspect, alone or in combination with one or more of the first through ninth aspects, generating the plurality of initial preamble sequences comprises generating a first initial preamble sequence based at least in part on a first root sequence and a first cyclic shift step size, and generating a second initial preamble sequence based at least in part on a second root sequence and a second cyclic shift step size.

In an eleventh aspect, alone or in combination with one or more of the first through tenth aspects, generating the plurality of initial preamble sequences comprises generating a first initial preamble sequence based at least in part on a first root sequence and a first cyclic shift step size, and generating a second initial preamble sequence based at least in part on the first root sequence and the first cyclic shift step size. In a twelfth aspect, alone or in combination with one or more of the first through eleventh aspects, generating the composite preamble sequence comprises applying a code cover to the composite preamble sequence. In a thirteenth aspect, alone or in combination with one or more of the first through twelfth aspects, a length of the code cover is determined based at least in part on a quantity of initial preamble sequences included in the plurality of initial preamble sequences.

In a fourteenth aspect, alone or in combination with one or more of the first through thirteenth aspects, the plurality of preamble sequence rules includes a preamble sequence rule that specifies a plurality of candidate cyclic shift step sizes for generating the preamble sequence, and generating the preamble sequence comprises selecting a cyclic shift step size from the plurality of candidate cyclic shift step sizes and generating the preamble sequence based at least in part on the cyclic shift step size. In a fifteenth aspect, alone or in combination with one or more of the first through fourteenth aspects, selecting the cyclic shift step size comprises selecting the cyclic shift step size based at least in part on an RRC state of the UE.

In a sixteenth aspect, alone or in combination with one or more of the first through fifteenth aspects, selecting the cyclic shift step size comprises selecting the cyclic shift step size based at least in part on a pathloss associated with the UE. In a seventeenth aspect, alone or in combination with one or more of the first through sixteenth aspects, selecting the cyclic shift step size comprises selecting the cyclic shift step size based at least in part on a distance, of the UE, from a center of a cell associated with the BS. In an eighteenth aspect, alone or in combination with one or more of the first through seventeenth aspects, the signaling communication comprises a SIB, an RRC communication, or a DCI communication. In a nineteenth aspect, alone or in combination with one or more of the first through eighteenth aspects, generating the preamble sequence comprises generating the preamble sequence based at least in part on a signal measurement of a reference signal transmitted by the BS.

In a twentieth aspect, alone or in combination with one or more of the first through nineteenth aspects, generating the preamble sequence based at least in part on the signal measurement of the reference signal transmitted by the BS comprises selecting one or more preamble sequence parameters, for generating the preamble sequence, based at least in part on the signal measurement of the reference signal transmitted by the BS and the plurality of preamble sequence rules. In a twenty-first aspect, alone or in combination with one or more of the first through twentieth aspects, the reference signal comprises at least one of an SSB, a SIB, a PRS, or a CSI-RS.

In a twenty-second aspect, alone or in combination with one or more of the first through twenty-first aspects, the signal measurement is an RSRP measurement, and generating the preamble sequence based at least in part on the signal measurement comprises generating, based at least in part on determining that the RSRP measurement satisfies a threshold, the preamble sequence for a msgA communication in a two-step RACH procedure based at least in part on a first preamble sequence configuration of the one or more preamble sequence configurations, or generating, based at least in part on determining that the RSRP measurement does not satisfy the threshold, the preamble sequence for a msg1 communication in a four-step RACH procedure based at least in part on a second preamble sequence configuration of the one or more preamble sequence configurations.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving, from a base station (BS), a signaling communication that indicates one or more preamble sequence configurations,
      wherein each of the one or more preamble sequence configurations specifies a respective plurality of preamble sequence rules for a different random access channel (RACH) procedure type
   and
   generating, based at least in part on a plurality of preamble sequence rules for a preamble sequence configuration of the one or more preamble sequence configurations, a preamble sequence for a RACH communication in a RACH procedure,
      wherein the plurality of preamble sequence rules comprises a preamble format rule that specifies a quantity of preamble sequences and a quantity of repetitions for the preamble sequence.

2. The method of claim 1, wherein the plurality of preamble sequence rules further comprises at least one of:
   a preamble sequence rule that specifies a plurality of candidate root sequences for generating the preamble sequence, or
   a cyclic shift rule that specifies a plurality of candidate cyclic shifts for generating the preamble sequence; and
   wherein generating the preamble sequence comprises at least one of:
      selecting a root sequence from the plurality of candidate root sequences,
      selecting a cyclic shift from the plurality of candidate cyclic shifts,
      generating the preamble sequence based at least in part on the root sequence and the cyclic shift, or
      generating the preamble sequence based at least in part on the quantity of preamble sequences and the quantity of repetitions for the preamble sequence.

3. The method of claim 2, wherein selecting the root sequence and the cyclic shift comprises:
selecting the root sequence and the cyclic shift based at least in part on at least one of:
a radio resource control (RRC) state of the UE,
a payload size of data to be transmitted in the RACH communication, or
an amount of Doppler shift associated with the UE.

4. The method of claim 2, wherein a first candidate root sequence and a first candidate cyclic shift, of the plurality of candidate root sequences and the plurality of candidate cyclic shifts, corresponds to a same time resource and a same frequency resource as a second candidate root sequence and a second candidate cyclic shift of the plurality of candidate root sequences and the plurality of candidate cyclic shifts.

5. The method of claim 2, wherein a first candidate root sequence of the plurality of candidate root sequences and a first candidate cyclic shift of the plurality of candidate cyclic shifts, and a second candidate root sequence of the plurality of candidate root sequences and a second candidate cyclic shift of the plurality of candidate cyclic shifts, correspond to different time resources and different frequency resources.

6. The method of claim 1, wherein the RACH communication comprises:
a msgA communication in a two-step RACH procedure, or
a msg1 communication in a four-step RACH procedure.

7. The method of claim 1, wherein generating the preamble sequence comprises:
generating a plurality of initial preamble sequences; and
generating a composite preamble sequence based at least in part on the plurality of initial preamble sequences.

8. The method of claim 7, wherein generating the composite preamble sequence comprises:
concatenating the plurality of initial preamble sequences to form the composite preamble sequence.

9. The method of claim 7, wherein generating the plurality of initial preamble sequences comprises:
generating a first initial preamble sequence based at least in part on a first root sequence and a first cyclic shift step size; and
generating a second initial preamble sequence based at least in part on the first root sequence and a second cyclic shift step size.

10. The method of claim 7, wherein generating the plurality of initial preamble sequences comprises:
generating a first initial preamble sequence based at least in part on a first root sequence and a first cyclic shift step size; and
generating a second initial preamble sequence based at least in part on a second root sequence and the first cyclic shift step size.

11. The method of claim 7, wherein generating the plurality of initial preamble sequences comprises:
generating a first initial preamble sequence based at least in part on a first root sequence and a first cyclic shift step size; and
generating a second initial preamble sequence based at least in part on a second root sequence and a second cyclic shift step size.

12. The method of claim 7, wherein generating the plurality of initial preamble sequences comprises:
generating a first initial preamble sequence based at least in part on a first root sequence and a first cyclic shift step size; and
generating a second initial preamble sequence based at least in part on the first root sequence and the first cyclic shift step size.

13. The method of claim 7, wherein generating the composite preamble sequence comprises:
applying a code cover to the composite preamble sequence,
wherein the code cover comprises:
an orthogonal code cover, or
a quasi-orthogonal code cover.

14. The method of claim 13, wherein a length of the code cover is determined based at least in part on a quantity of initial preamble sequences included in the plurality of initial preamble sequences.

15. The method of claim 1, wherein the plurality of preamble sequence rules includes a preamble sequence rule that specifies a plurality of candidate cyclic shift step sizes for generating the preamble sequence; and
wherein generating the preamble sequence comprises:
selecting a cyclic shift step size from the plurality of candidate cyclic shift step sizes, and
generating the preamble sequence based at least in part on the cyclic shift step size.

16. The method of claim 15, wherein selecting the cyclic shift step size comprises:
selecting the cyclic shift step size based at least in part on a radio resource control (RRC) state of the UE.

17. The method of claim 15, wherein selecting the cyclic shift step size comprises:
selecting the cyclic shift step size based at least in part on a pathloss associated with the UE.

18. The method of claim 15, wherein selecting the cyclic shift step size comprises:
selecting the cyclic shift step size based at least in part on a distance, of the UE, from a center of a cell associated with the BS.

19. The method of claim 1, wherein the signaling communication comprises:
a system information block (SIB),
a radio resource control (RRC) communication, or
a downlink control information (DCI) communication.

20. The method of claim 1, wherein generating the preamble sequence comprises:
generating the preamble sequence based at least in part on a signal measurement of a reference signal transmitted by the BS.

21. The method of claim 20, wherein generating the preamble sequence based at least in part on the signal measurement of the reference signal transmitted by the BS comprises:
selecting one or more preamble sequence parameters, for generating the preamble sequence, based at least in part on:
the signal measurement of the reference signal transmitted by the BS, and
the plurality of preamble sequence rules.

22. The method of claim 20, wherein the reference signal comprises at least one of:
a synchronization signal block (SSB),
a system information block (SIB),
a positioning reference signal (PRS), or
a channel state information reference signal (CSI-RS).

23. The method of claim 20, wherein the signal measurement is a reference signal received power (RSRP) measurement; and
wherein generating the preamble sequence based at least in part on the signal measurement comprises:

generating, based at least in part on determining that the RSRP measurement satisfies a threshold, the preamble sequence for a msgA communication in a two-step RACH procedure based at least in part on a first preamble sequence configuration of the one or more preamble sequence configurations, or generating, based at least in part on determining that the RSRP measurement does not satisfy the threshold, the preamble sequence for a msg1 communication in a four-step RACH procedure based at least in part on a second preamble sequence configuration of the one or more preamble sequence configurations.

24. A user equipment (UE) for wireless communication, comprising:

a memory; and one or more processors operatively coupled to the memory, the memory and the one or more processors configured to:

receive, from a base station (BS), a signaling communication that indicates one or more preamble sequence configurations, wherein each of the one or more preamble sequence configurations specifies a respective plurality of preamble sequence rules for a different random access channel (RACH) procedure type;

and generate, based at least in part on a plurality of preamble sequence rules for a preamble sequence configuration of the one or more preamble sequence configurations, a preamble sequence for a RACH communication in a RACH procedure, wherein the plurality of preamble sequence rules comprises a preamble format rule that specifies a quantity of preamble sequences and a quantity of repetitions for the preamble sequence.

25. The UE of claim 24, wherein the plurality of preamble sequence rules further comprises at least one of:

a preamble sequence rule that specifies a plurality of candidate root sequences for generating the preamble sequence, or a cyclic shift rule that specifies a plurality of candidate cyclic shifts for generating the preamble sequence; and wherein the one or more processors, when generating the preamble sequence, are to at least one of:

select a root sequence from the plurality of candidate root sequences, select a cyclic shift from the plurality of candidate cyclic shifts, generate the preamble sequence based at least in part on the root sequence and the cyclic shift, or generate the preamble sequence based at least in part on the quantity of preamble sequences and the quantity of repetitions for the preamble sequence.

26. The UE of claim 24, wherein the one or more processors, when generating the preamble sequence, are to:

generate, based at least in part on determining that a reference signal received power (RSRP) measurement of a reference signal transmitted by the BS satisfies a threshold, the preamble sequence for a msgA communication in a two-step RACH procedure based at least in part on a first preamble sequence configuration of the one or more preamble sequence configurations, or generate, based at least in part on determining that the RSRP measurement does not satisfy the threshold, the preamble sequence for a msg1 communication in a four-step RACH procedure based at least in part on a second preamble sequence configuration of the one or more preamble sequence configurations.

27. A non-transitory computer-readable medium storing one or more instructions for wireless communication, the one or more instructions comprising:

one or more instructions that, when executed by one or more processors of a user equipment (UE), cause the one or more processors to:

receive, from a base station (BS), a signaling communication that indicates one or more preamble sequence configurations, wherein each of the one or more preamble sequence configurations specifies a respective plurality of preamble sequence rules for a different random access channel (RACH) procedure type and generate, based at least in part on a plurality of preamble sequence rules for a preamble sequence configuration of the one or more preamble sequence configurations, a preamble sequence for a RACH communication in a RACH procedure, wherein the plurality of preamble sequence rules comprises a preamble format rule that specifies a quantity of preamble sequences and a quantity of repetitions for the preamble sequence.

28. The non-transitory computer-readable medium of claim 27, wherein the plurality of preamble sequence rules further comprises at least one of:

a preamble sequence rule that specifies a plurality of candidate root sequences for generating the preamble sequence, or a cyclic shift rule that specifies a plurality of candidate cyclic shifts for generating the preamble sequence; and wherein the one or more instructions, that cause the one or more processors to generate the preamble sequence, cause the one or more processors to at least one of:

select a root sequence from the plurality of candidate root sequences, select a cyclic shift from the plurality of candidate cyclic shifts, generate the preamble sequence based at least in part on the root sequence and the cyclic shift, or generate the preamble sequence based at least in part on the quantity of preamble sequences and the quantity of repetitions for the preamble sequence.

29. An apparatus for wireless communication, comprising:

means for receiving, from a base station (BS), a signaling communication that indicates one or more preamble sequence configurations, wherein each of the one or more preamble sequence configurations specifies a respective plurality of preamble sequence rules for a different random access channel (RACH) procedure type;

and means for generating, based at least in part on a plurality of preamble sequence rules for a preamble sequence configuration of the one or more preamble sequence configurations, a preamble sequence for a RACH communication in a RACH procedure, wherein the plurality of preamble sequence rules comprises a preamble format rule that specifies a quantity of preamble sequences and a quantity of repetitions for the preamble sequence.

30. The apparatus of claim 29, wherein the plurality of preamble sequence rules further comprises at least one of:

a preamble sequence rule that specifies a plurality of candidate root sequences for generating the preamble sequence, or a cyclic shift rule that specifies a plurality of candidate cyclic shifts for generating the preamble sequence; and wherein the means for generating the preamble sequence comprises at least one of:

means for selecting a root sequence from the plurality of candidate root sequences, means for selecting a cyclic shift from the plurality of candidate cyclic shifts, means for generating the preamble sequence based at least in part on the root sequence and the cyclic shift, or means for generating the preamble sequence based at least in part on the quantity of preamble sequences and the quantity of repetitions for the preamble sequence.

* * * * *